United States Patent
McKinnon

(10) Patent No.: US 9,874,243 B2
(45) Date of Patent: Jan. 23, 2018

(54) AXEL BUSH

(71) Applicant: Rotacaster Wheel Limited, Tighes Hill (AU)

(72) Inventor: Peter R. McKinnon, Merewether (AU)

(73) Assignee: ROTACASTER WHEEL LIMITED, Tighes Hill, NSW (AU)

( * ) Notice: Subject to any disclaimer, the term of this patent is extended or adjusted under 35 U.S.C. 154(b) by 0 days.

(21) Appl. No.: 14/405,140

(22) PCT Filed: Dec. 20, 2013

(86) PCT No.: PCT/AU2013/001493
§ 371 (c)(1),
(2) Date: Dec. 2, 2014

(87) PCT Pub. No.: WO2014/089642
PCT Pub. Date: Jun. 19, 2014

(65) Prior Publication Data
US 2015/0147011 A1    May 28, 2015

Related U.S. Application Data

(60) Provisional application No. 61/735,980, filed on Dec. 11, 2012, provisional application No. 61/915,340, filed on Dec. 12, 2013.

(51) Int. Cl.
*F16C 33/02* (2006.01)
*F16C 33/04* (2006.01)
(Continued)

(52) U.S. Cl.
CPC ............ *F16C 33/046* (2013.01); *B60B 27/00* (2013.01); *F16C 13/006* (2013.01); *F16C 35/02* (2013.01); *F16C 43/02* (2013.01)

(58) Field of Classification Search
CPC .......... F16C 13/02; F16C 17/00; F16C 17/02; F16C 17/022; F16C 31/02; F16C 33/04;
(Continued)

(56) References Cited

U.S. PATENT DOCUMENTS 1,213,684 A * 1/1917 Osterholm .............. F16C 43/02
138/145
1,298,100 A * 3/1919 Royce ..................... F16C 43/02
138/156
(Continued)

FOREIGN PATENT DOCUMENTS

GB    927890 A    6/1963
WO    0043642 A1   7/2000
(Continued)

OTHER PUBLICATIONS

PCT International Search Report, PCT/AU2013/001493, dated Dec. 20, 2013.
(Continued)

*Primary Examiner* — James Pilkington
(74) *Attorney, Agent, or Firm* — TraskBritt, P.C.

(57) ABSTRACT

An assembled roller comprising a cylindrical bush having eight external rib surface features and an over-molded roller. The joining edge of the opposing component parts comprises, in axial end profile, a ramp section comprising a ramp surface. The ramp surfaces lie in planes that are parallel or slightly offset by 1° to 20° to the direction or angle of approach of the respective opposed component part immediately prior to engagement, so that the ramp surfaces are adapted to slidingly engage across ramp surfaces in a resistance, rather than snap, fit. This arrangement forms a catch that will hold the component part halves together during an over-molding process as long as the ends of the bush are retarded against axial displacement.

13 Claims, 14 Drawing Sheets

(51) Int. Cl.
*B60B 27/00* (2006.01)
*F16C 13/00* (2006.01)
*F16C 35/02* (2006.01)
*F16C 43/02* (2006.01)

(58) Field of Classification Search
CPC ........ F16C 33/046; F16C 33/08; F16C 43/02; B60B 19/003; B60B 27/02; B60B 2380/18
See application file for complete search history.

(56) References Cited

U.S. PATENT DOCUMENTS

| | | | |
|---|---|---|---|
| 1,913,204 | A | 6/1933 | Larzelere Benton |
| 2,464,653 | A | 3/1949 | Phipps |
| 4,909,638 | A | 3/1990 | Muto |
| 5,013,166 | A | 5/1991 | Domer |
| 5,072,821 | A | 12/1991 | Kruse et al. |
| 6,086,327 | A | 7/2000 | Mack et al. |
| 6,283,902 | B1 | 9/2001 | Bakoledis |
| 6,386,763 | B1 | 5/2002 | Mack et al. |
| 6,755,405 | B2 | 6/2004 | Kammel et al. |
| 7,458,726 | B2 | 12/2008 | Seilheimer |
| D676,214 | S | 2/2013 | McKinnon |
| 9,248,698 | B2 | 2/2016 | McKinnon et al. |
| 2002/0186905 | A1 | 12/2002 | Kammel et al. |
| 2012/0019048 | A1 | 1/2012 | McKinnon et al. |
| 2015/0147011 | A1 | 5/2015 | McKinnon |
| 2016/0193871 | A1 | 7/2016 | McKinnon et al. |

FOREIGN PATENT DOCUMENTS

| | | |
|---|---|---|
| WO | 2004014667 A1 | 2/2004 |
| WO | 2009079979 A1 | 7/2009 |
| WO | 2014089642 A1 | 6/2014 |

OTHER PUBLICATIONS

Global Dossier for U.S. Appl. No. 14/405,140 dated Oct. 13, 2016.
PCT International Preliminary Report on Patentability, PCT/AU2013/001493, dated Dec. 8, 2014.
PCT International Written Opinion, PCT/AU2013/001493, dated Feb. 17, 2014.

\* cited by examiner

AXEL BUSH

CROSS-REFERENCE TO RELATED APPLICATIONS

This application is a national phase entry under 35 U.S.C. §371 of International Patent Application PCT/AU2013/001493, filed Dec. 20, 2013, designating the United States of America and published in English as International Patent Publication WO 2014/089642 A1 on Jun. 19, 2014, which claims the benefit under Article 8 of the Patent Cooperation Treaty and under 35 U.S.C. §119(e) to U.S. Provisional Patent Application Ser. Nos. 61/915,340, filed Dec. 12, 2013, and 61/735,980, filed Dec. 11, 2012, the disclosure of each of which is hereby incorporated herein in its entirety by this reference.

TECHNICAL FIELD

This disclosure relates to an axel bush. More particularly, this disclosure relates to an axel bush. More particularly, this disclosure relates to an axel bush for attaching to an axel in situ. Still more particularly, this disclosure relates to an axel bush for an industrial wheel, particularly a multiple directional wheel.

BACKGROUND

The following references to, and descriptions of, prior proposals or products are not intended to be, and are not to be construed as, statements or admissions of common general knowledge in the art. In particular, the following prior art discussion does not relate to what is commonly or well known by the person skilled in the art, but assists in the understanding of the disclosed step of the disclosure of which the identification of pertinent prior art proposals is but one part.

Where it is not practical to form axel bushes in a complete cylindrical form because the section on which the axel bush is to be mounted on the axel is smaller in diameter than the diameter of the axel beyond the section, axel bushes must necessarily be either molded onto the axel section or formed from longitudinal halves that may be joined together to form the bush on the axel. This may also be the case where the axel is non-removably mounted, so that the axel bush cannot be slid onto the axel mounting section as there is no access to the other end of the axel. Accordingly, there is a need for an improved axel bush that can be mounted to an axel where it is not possible to slide the axel bush onto the axel mounting section via either end of the axel. Prior art proposals have included forming the axel bush from two halves that can be joined together in situ. However, such prior art bushes tend to fail along the joining line, the so-called coin-purse split or separation of the components along the joining line under pressure.

In discussing the word "axel" or "axels," it will be appreciated that the bush disclosed herein is adapted to attach to other shafts and rods for useful purposes.

An object of the disclosure is to ameliorate the aforementioned disadvantages of the prior art or to at least provide a useful alternative thereto.

BRIEF SUMMARY

The disclosure according to one or more aspects is as defined in the independent claims. Some optional and/or preferred features of the disclosure are defined in the dependent claims.

Accordingly, in one aspect of the disclosure, there is provided an axel bush formed by joining edges of component parts together to form a generally cylindrical bush by joining the component parts along the joinable edges, the joinable edges following a line that is at least partially non-parallel to the longitudinal axis of the generally cylindrical bush.

In another aspect, the disclosure provides an axel bush for mounting on a mounting section of an axel, the axel bush formed from multiple parts that are adapted to join along at least one longitudinal edge to form the axel bush, wherein the longitudinal edge is at least partially non-parallel to the longitudinal axis of the axel.

In another aspect, the disclosure provides complementary component parts of a bush for an axel that fit together around the axel, the component parts each having at least one opposing joining edge following a substantially curved path.

Preferably, the component parts slide into engagement and are trapped together against radial parting, provided that the respective ends of the assembled bush are axially retarded to resist axial movement of the component parts relative to each other.

In another aspect, the disclosure provides a split bush formed by joining component parts along at least one joining line, characterized in that the joining line follows a curved path.

The longitudinal edge of the component parts of the axel bush may follow a curved or irregular line or a combination of both. The curved line may be helical, spiral, S-shaped, wavy and/or radiused. The irregular line may comprise straight sections connected by sharp angle transitions. The irregular line may be jagged, including having a Z- or V-shape, in which the sharp angle transitions are at least 90°.

Typically, the bush may be retained on an axel and trapped against longitudinal displacement of the component parts relative to each other.

Preferably, the joining line is spiral or helical in shape. The curved joining line is effective to resist splitting of the bush under pressure.

The disclosure may be used where the axel configuration does not allow a bush to be placed on the axel, except where the bush is a split bush. The curved joining edges of the component parts may follow a spiral pathway so that the component part partially wraps around the axel. The semi-circular end wall of the component part at a first end may be offset by about 60°-110° compared to a second opposed end. The component parts may comprise two joining walls. When viewed in end elevation, the extremity of a first joining wall at the first end may be close to the extremity of a second joining wall at the second end, so that the spacing between the extremities from an axial end view is smaller than the diameter of the axel. The spiral path of the joining walls may be sufficiently acute that each component part is adapted to wrap around the axel, so that the component cannot easily be removed from the axel by laterally moving the component part away from the axel but maintaining the component part in coaxial relationship to the axel. The component part may only be removed by extricating one component part end, shifting the component part on an angle to allow the mouth defining the second end to release the axel from the second end mouth.

Locating protrusions may extend tangentially from each of the facing edges. The protrusions may form part of the wall of the bush components. The protrusions may have facing and abutting surfaces that are aligned parallel to one another. Each end of the bush component may be a semi-circular shape. Each semi-circular end may be adapted to engage with an opposed component part to form a complete circular end wall of a cylinder. The protrusions may extend toward the direction of approach of a complementary component part.

At least one section of the joining or longitudinal line may be an angled section set at an angle, preferably a sharp angle, relative to the curved joining edge. The angled section may be a flat section that may extend parallel to the longitudinal axis of the formed bush. The flat section of each component part may be effective to prevent counter-rotation of the component parts about the longitudinal axis, so that when the bush is assembled on an axel and is axially trapped, the component parts do not slide along the joining line relative to each other and do not rotate relative to each other.

Preferably, the flat section is at the end of the joining line. Advantageously, each component part includes a flat section adapted to oppose and abut a corresponding, complementary flat section of a complementary component part. The flat section may form part of the joining line. Alternatively, the joining line may be wholly curved. Preferably, the flat section is adjacent to the curved joining line.

The joining line is preferably formed by opposing curved surfaces. The opposing surfaces preferably comprise laterally flat seats that follow the curved path. The opposing laterally flat, longitudinally curved seats of each component part are adapted to abut to form complementary seats for each other.

The component parts may each include an engagement section. The engagement sections may be complementary and adapted to engage an opposing engagement section of another component part. The engagement section may include a ramp section. The ramp section may comprise opposing and abutting surfaces that lie in planes between 0° and 110° relative to the direction of approach of the opposing component part. In this way, the ramp sections may slide past each other as cam surfaces into abutment. The ramp sections may form part of head portions that are adapted to be trapped behind an opposing head in a recess of the other component part. The ramp sections, therefore, engage each other with minimal distortion. The ramp sections do not snap into engagement but slide into abutment to create a resistant catch. However, due to the relative geometry of the spiral component part body that may be adapted to partially wrap around the axel, the engagement sections trap the component parts in engagement because the parts cannot be pulled laterally or radially away from each other as the angle of removal and the planes of the ramp sections are offset from the angle of withdrawal that would be necessary to separate the component parts.

The flat or ramp section may permit movement of the component parts of an assembled bush relative to each other under load. Permitting relative movement of the component parts while securely maintaining their engagement enables the bush to distort under load without the component parts separating or the bush otherwise failing. If the component parts were positively engaged so that distortion of the engagement means and potential disengagement would result on application of heavy loads, the bush might fail or the engagement means might snap in and out of engagement under load, thereby causing an unwanted clicking noise. Preferred embodiments of this disclosure may overcome this problem by allowing the bush to distort and shift slightly along the joining line without the component parts separating.

The ramp section may be effective to hold the component parts together at the joining line against compression forces that would otherwise cause the component parts to split or separate. This is achieved by providing opposing surfaces that resist counter-rotation of the component parts about the longitudinal axis of the bush. The flat or ramp sections also act as a catch to hold the bush together by axial restriction of the bush at either end, so that the component parts cannot axially slide and rotate relative to each other.

A wheel member or tire may be molded onto the bush after the bush has been assembled onto an axel. The tire may be a roller tire. The roller may form part of a multiple directional wheel. However, other applications are envisaged as being within the scope of the disclosure. The generally cylindrical bush may include external surface features to assist in gripping the interior surface of a roller or other component to be molded thereto. The surface features may include undulations, protrusions, grooves, knobs or ridges. The ridges or grooves may follow a curved or irregular line or a combination of both. The curved line may be helical, spiral, S-shaped, wavy and/or radiused. The irregular line may comprise straight sections connected by sharp angle transitions. The irregular line may be jagged, including having a Z- or V-shape. Preferably, the surface features comprise one or more longitudinal ridges. The longitudinal surface features may extend parallel to the longitudinal axis of the completed or generally cylindrical bush. The longitudinal surface features may be regularly circumferentially spaced from each other around the outer surface of the axel bush.

The external surface features may be in the form of protrusions or indentations. The external surface features may be effective to facilitate adherence of a mold material thereto. The protrusions are preferably longitudinal ribs. The longitudinal ribs may be circumferentially spaced around the outer surface of the barrel of the assembled bush. The component parts may comprise separate portions of the external surface features that align and are completed on joining the component parts. Thus, each component part may include portions of a rib that is only completed on joining the component parts.

The contour of the longitudinal ribs preferably provide longitudinal structural strength. The longitudinal ribs are preferably configured to displace roller material so that less roller material is required to fill the space between the outer bush surface and the outer roller surface. The external surface features also permit careful control of the thickness of the roller wall molded onto the bush. This may be important with regard to performance characteristics, such as structural integrity during repeated, possibly high-load, use, ride quality and/or noise minimization of a wheel incorporating the bush.

Where one or more separate internal bearings are required, these may be in the form of split bearings. The split bearings may comprise two or more bearing parts, such as a pair of halves, that together form the bearing. The internal surface of the bush may accommodate the bearings as a housing. The bush housing may provide means for permitting over-molding of the split bearings. The bearing may be accommodated by internal surface features, such as an annular seat groove formed in the internal wall of the bush. The internal surface features may be completed on assembly of the component parts. Portions of the internal surface features may be located on separate component parts that align to complete the internal surface features when the bush is assembled. The internal surface features may be longitudinally spaced to effectively trap the bearings and ensure that they remain properly spaced along the length of the axel and the bush.

The bush may be formed from component parts that are hinged or connected along one or more permanent longitudinal joints, and are joinable together at another pair of opposed longitudinal edges circumferentially spaced from the permanent longitudinal joints. The component parts may comprise two parts. The two parts may be permanently hingedly connected, and have mating longitudinal edges circumferentially spaced from the permanent longitudinal connections. The component parts may comprise two separate parts mateable or joinable together to form the generally cylindrical bush. The component parts may be identical and include mutually engageable complementary parts.

The joinable or mateable edges may form the mutually complementary engageable parts, such as male-female tongue and groove parts, protrusions and recesses for trapping the protruding parts. The engageable or joinable parts may include, in profile and extending longitudinally along the respective edges, a head, or bayonet or arrowhead-shaped male mating or protruding portion having a protruding edge that transitions into a ramp surface of the ramp section. The ramp surface may be inclined at an angle to a radial line extending from the longitudinal axis of the completed bush cylinder. The ramp section may terminate with a detent wall in the form of a flat broad structure behind the head, bayonet or arrowhead ramp section that directly faces an opposing broad flat surface on an opposing component part. The bayonet or arrowhead or ramp section may be connected to a semi-cylindrical wall of a component part by a narrow neck, whereby a recess is defined by the flat, broad detent wall, the internal surface of the bush facing toward the radial center of the semi-cylindrical wall and forming part of the neck, and a broad face of the end wall of the cylindrical wall facing axially. These structural and surface features together define a recess for receiving and/or trapping a head portion, in profile, formed at the terminal edge of the joining edge of the opposed component part.

Other male-female engageable or complementary, friction-fit parts are envisaged as falling within the scope of the disclosure.

The axel bush may comprise an internal bore that includes internal surface features that are adapted to either engage with an axel for a driven roller or wheel, or may comprise a smooth bore to permit rotation of the bush relative to the axel.

The completed and assembled bush formed from the component parts may comprise a generally cylindrical core, pipe or tube and external surface features in the form of longitudinal ridges or ribs. The external surface features may have a greater radial height toward their middle center and may taper toward the outer surface of the generally cylindrical core, pipe or tube. Accordingly, in side elevation, the outline of the axel bush may be generally fusiform in silhouette.

BRIEF DESCRIPTION OF THE DRAWINGS

The disclosure may be better understood from the following non-limiting description of preferred embodiments, in which:

FIG. 14b is an end elevation of the assembled axel bush shown in FIG. 14a;

FIG. 34b is a perspective view of a component part of the bush embodiment shown in FIG. 34a from two different perspectives, emphasizing that identical component halves form the bush of FIG. 34a;

FIG. 35a is a perspective view of a cylindrical bush according to another embodiment in which end flats and catches have been added to the embodiment shown in FIG. 34a;

FIG. 35b is a perspective view of a component part of the bush embodiment shown in FIG. 35a, noting that identical component halves form the bush of FIG. 35a;

FIG. 36a is a perspective view of a cylindrical bush with an over-molded roller according to another embodiment in which ribs have been added to the embodiment shown in FIG. 35a;

FIG. 36b is a perspective view of a component part of the bush embodiment shown in FIG. 36a, noting that identical component halves form the bush of FIG. 36a;

DETAILED DESCRIPTION

Preferred features of this disclosure will now be described with particular reference to the accompanying drawings. However, it is to be understood that the features illustrated in and described with reference to the drawings are not to be construed as limiting on the scope of the disclosure.

Figure 1:
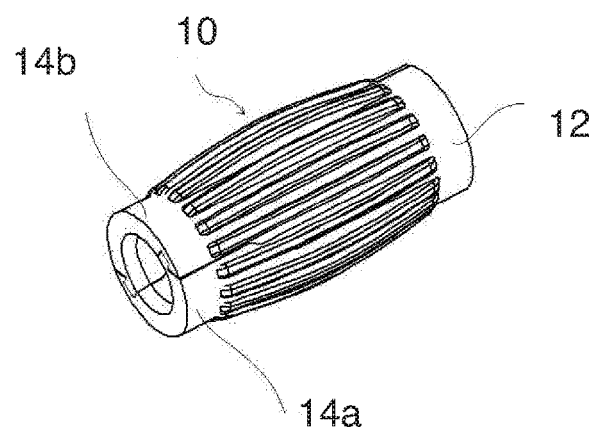
FIG. 1 is a perspective view of a first embodiment of an axel bush, according to one aspect of the disclosure, comprising a tongue and recess locating system, 16 outer ribs and a helical joining edge.
Figure 2:
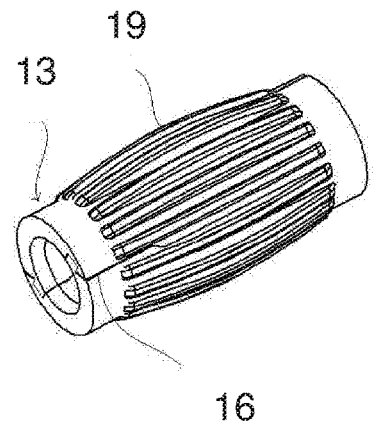
FIG. 2 is a perspective view of the embodiment shown in FIG. 1.
Figure 3:
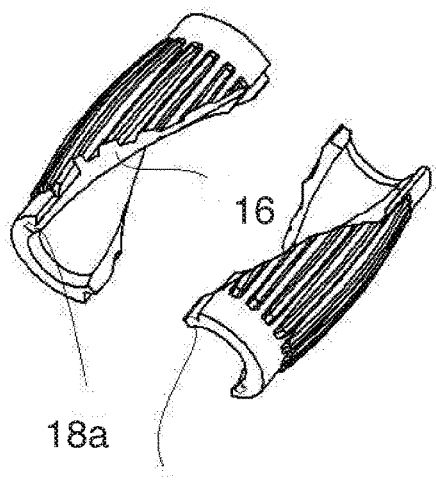
FIG. 3 is a perspective exploded view of the embodiment of FIGS. 1 and 2.
Figure 4A:
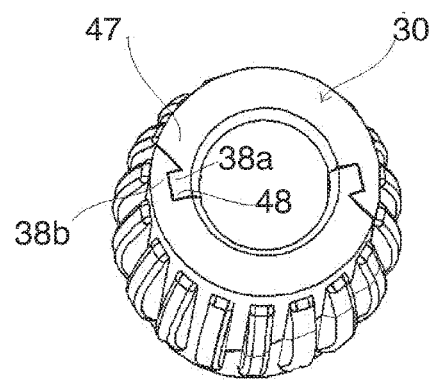
FIG. 4a is an end perspective view of the axel bush shown in FIG. 3.
Figure 4B:
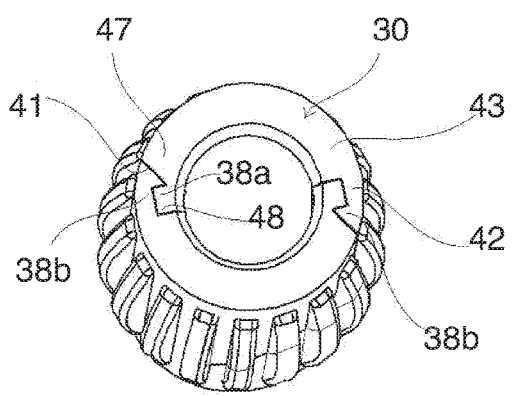
FIG. 4b is an end perspective view of the axel bush shown in FIG. 3.
Figure 5:
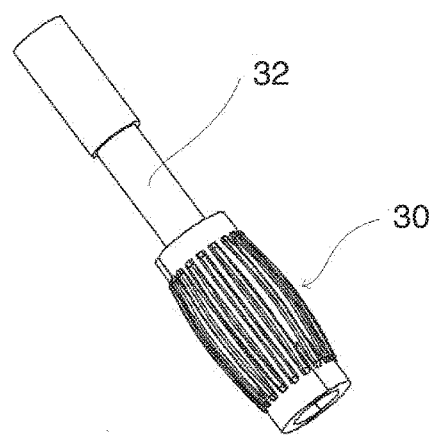
FIG. 5 is a perspective view of the axel bush shown in FIG. 3 partially mounted on an axel.
Figure 6:
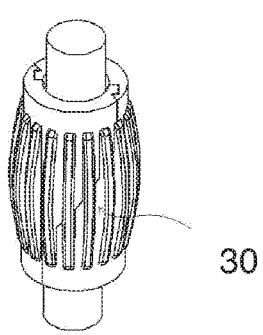
FIG. 6 is a perspective view of the axel bush shown in FIGS. 3-5b mounted on an axel.
Figure 7:
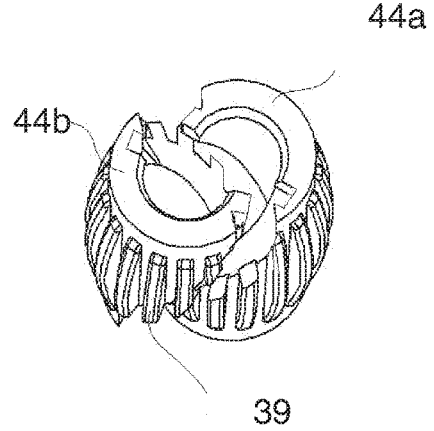
FIG. 7 is an end perspective view of the axel bush shown in FIGS. 3-6 with its component parts separated.
Figure 8:
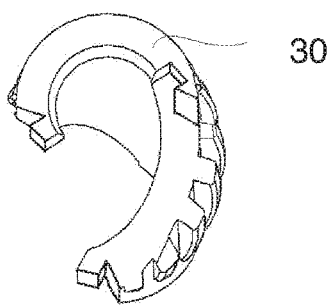
FIG. 8 is an end perspective view of the axel bush shown in FIGS. 3-7.
Figure 9:
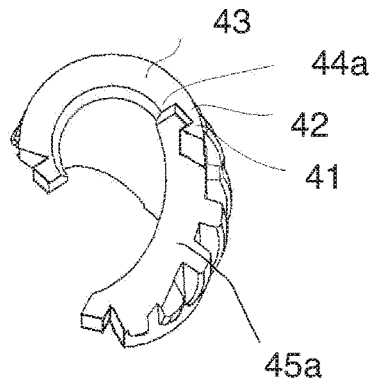
FIG. 9 is an end perspective view of one component part of the axel bush shown in FIGS. 3-8.

FIGS. 1-3 show a first embodiment of the disclosure in the form of an axel bush 10 comprising a cylindrical core 12, a pair of identical component parts 14a, 14b mated or joined to each other along a pair of helically curved edges 16. The curved edges 16 comprise tongue and groove interconnecting parts 18a, 18b. An outer surface 13 of the cylindrical core 12 has sixteen longitudinally aligned ribs 19.

Figure 24:
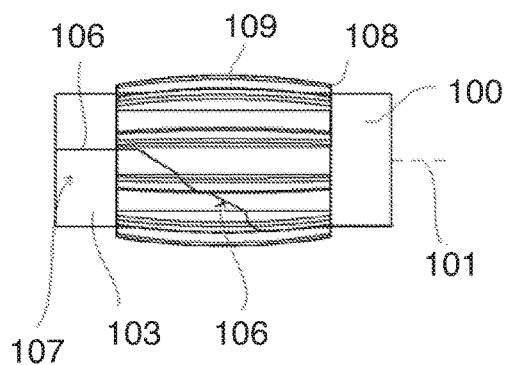
FIG. 24 is a side view of a completed axel bush according to an eighth embodiment featuring a bayonet catch, eight longitudinal ridge outer surface features having straight-edged terminal ends and Z-shaped joining edges.
Figure 25:
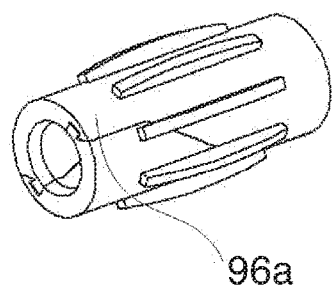
FIG. 25 is a perspective view of the axel bush shown in FIG. 24.
Figure 26:
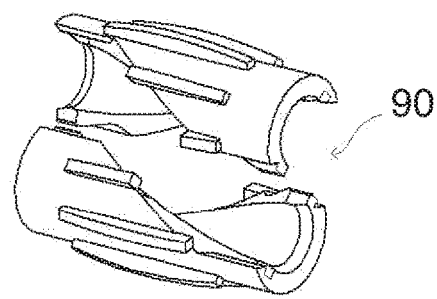
FIG. 26 is a perspective view of an unassembled pair of component parts of the axel bush shown in FIGS. 21-23.
Figure 27:
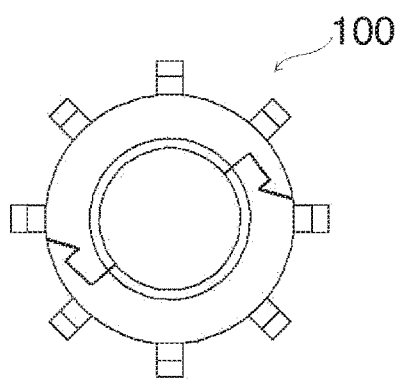
FIG. 27 is an end view of the completed axel bush shown in FIGS. 24 and 25.
Figure 28:
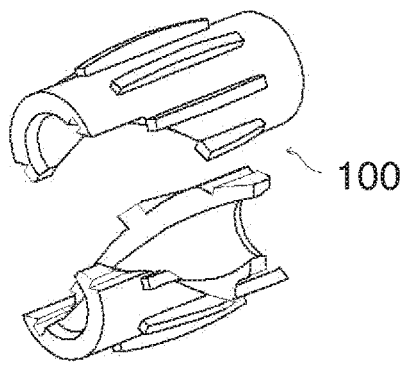
FIG. 28 is a perspective view of an unassembled pair of component parts of the axel bush shown in FIG. 24.
Figure 29:
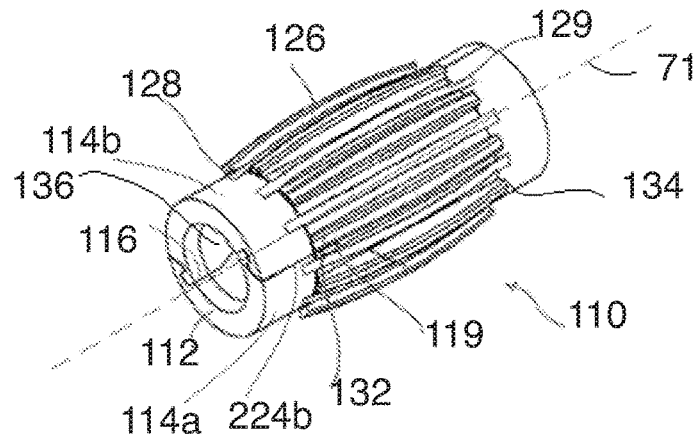
FIG. 29 is a perspective view of an assembled axel bush made according to a ninth embodiment comprising a bayonet catch, 16 longitudinal ridge or rib portions on its outer surface, with the rib portions alternating between raised and lower profile rib portions and Z-shaped joining edges.
Figure 30:
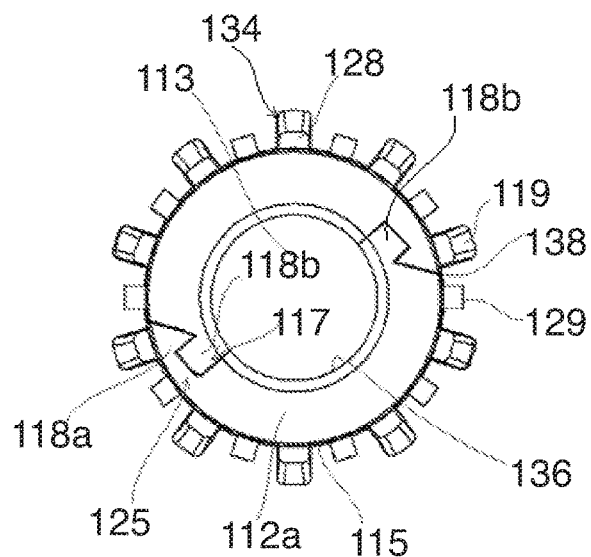
FIG. 30 is an end view of the completed axel bush shown in FIG. 29.
Figure 31:
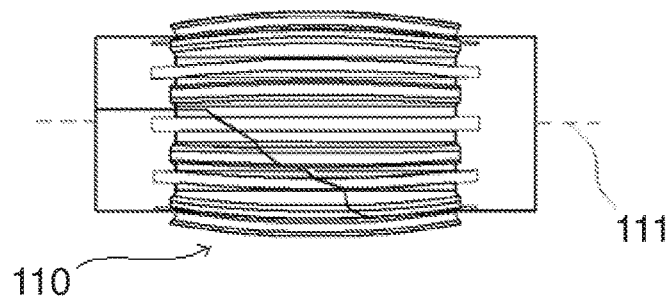
FIG. 31 is a side view of the axel bush shown in FIGS. 29 and 30.
Figure 32:
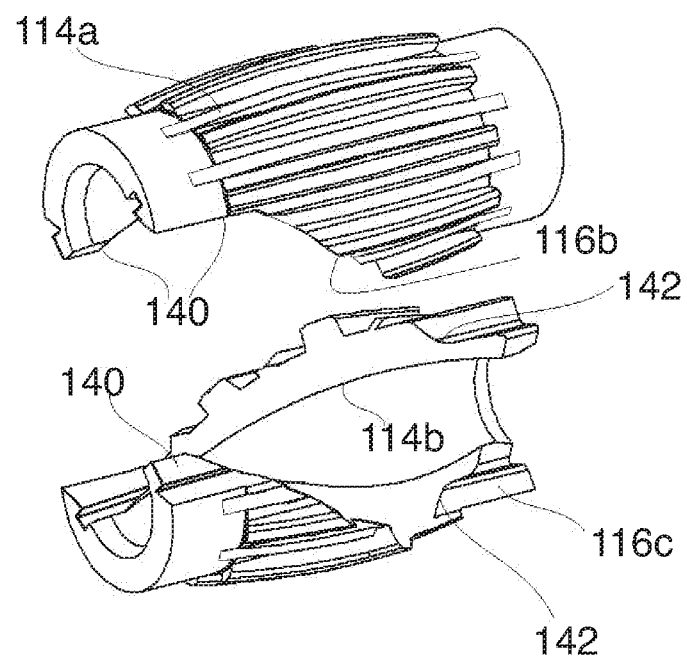
FIG. 32 is a perspective view of the unassembled component parts of the axel bush shown in FIGS. 29-31.

Each component part 14a, 14b comprises a pair of helically curving side edges 16 that are perfectly complementary to opposing helically curved edges on the other mating or joining component part 14a, 14b. Each component part 14a, 14b is identical. At one end of the component part 14a, 14b, adjacent the helically curved edge 16, there is a male protruding tongue 18b that extends beyond the flush surface of the helically curved edge 16. At the opposed end of the component part 14a, 14b, the respective helically curved edges 16 terminate with a recess 18a that is complementary to the protrusion 18b. Both the protrusion 18b and the complementary recess 18a are adjacent the inner surface of the cylindrical core 12. The component parts 14a, 14b are held together in situ in an engaging or joining position by the male and female engagement means, the tongue and recess parts 18a, 18b. The radial compressive forces caused by molding a roller thereon or thereabout the bush, so that the inward radial compressive force urges the component parts 14a, 14b to counter rotate relative to each other along their helical joining lines, is resisted by the flat sections adjacent the tongue and recess parts that ensure that the component parts 14a, 14b of the axel bush 10 does not counter rotate and remains assembled. The flat sections are shown in FIGS. 10, 13, 24 and 32. The end flat sections of the third embodiment shown in FIG. 10 transition between an intermediate angular section with shallow angled corners 58. The angled corners 58 have an angle that is at least 90° to resist counter-rotation of the component parts 54a,b relative to one another. In the fifth embodiment shown in FIG. 13, Z-shaped outer side edges 76 comprise a middle inclined section 76b extending between outer straight edges 76a, 76c running substantially parallel to a longitudinal axis 71. In FIG. 24, there is shown an axel bush 100 according to an eighth embodiment showing a shallow z-shaped outer longitudinal edge 106 with the straight end walls 106 that extend normally to a longitudinal axis 101 and transition to an intermediate section through shallow angles that are at least 90°. In FIG. 32, each component part 114a, 114b includes a pair of the Z-shaped joining side edges 116 that extend along a straight edge wall 116a to a first corner point 140. The first corner point 140 provides the transition from an axially parallel wall edge 116a to an inclined edge wall 116b extending through an intermediate region of the side wall 116. The first corner point 140 has an angle that is at least 90°. The curved edges 16 of the respective component parts 14a, 14b, therefore, remain joined together while compressive forces are applied to the bush. These forces may be deflected and disseminated along the curved joining line of the edges 16, so that localization of loading at any one point along the edges 16 is reduced and failure of the axel bush 10 is minimized.

FIGS. 4-9 show an axel bush 30 made according to a second embodiment mounted to a wheel frame manufactured and supplied by Rotacaster Wheel Limited. The axel bush may comprise a bayonet catch, 16 outer ribs and a helical joining edge, that are mounted to an axel of a wheel frame of a multiple directional wheel. Prior to assembly, the bush 30 is comprised of two identical halves. The component halves are placed around a cylindrical axel 32 (not shown) mounted and extending between wheel frame head posts 34. A roller (not shown) may then be molded around the axel bush 30 as described in WO 2004014667, the entire contents of which are hereby incorporated herein.

As shown in FIGS. 4a-9, the axel bush 30 comprises a pair of identical halves 44a, 44b that are adapted to engage together by allowing the engagement of bayonet or arrowhead, or abutting ramp members 38b that comprise an inner inclined ramp surface 41 and a narrow neck 42 that connects the arrowhead or ramp member 38b to the wall of the semi-cylindrical core structure 43. The arrowhead structure or ramp member 38b is provided at the end of each component part 44a, 44b adjacent one longitudinal side or edge 45a of each component part. An opposed edge 45b to the edge 45a comprises complementary engagement or joining structures 38a in the form of a substantially square-shaped (in profile) head behind which extends an outwardly inclined recess surface 47 that is adapted to slidingly receive and trap the arrowhead ramp member 41, while the neck recess 48 defined by the arrowhead ramp member 41, neck 42 and the end surface of the semi-cylindrical core wall 43, respectively receive and trap the square head 38*a* for an exceptionally strong, friction-resistant engagement at both adjoining edges 45*a*, 45*b* of each of the component parts. Preferably, the material used to form the respective component parts 44*a*, 44*b* is typically acetal. Taking into consideration the wall thickness and rib structures 39 and the rigidity to the bush structure imparted by the ribs 39 in the longitudinal direction, because the mating parts 18*a*, 18*b* are not positively engaged but merely form a resistance fit, the component parts 44*a*, 44*b* may be mounted on the axel 32 by hand. It is envisaged that the component parts 44*a*, 44*b* are made from extremely rigid material, such as steel, so that the mating of the component parts with a cam or ramp surface engagement allows the bush to be assembled without the need for a radially compressive tool to achieve the assembly of the axel bush 30 on the axel 32. It is noted that the rib structures 19 extend longitudinally along the outer surface of the axel bush 30 and provide reinforcement to the overall structure of the core 43. To remove the bush from an axel, wherein the component parts 14*a*, 14*b* are axially trapped against counter rotation relative to each other, a tool may be helpful to urge the ramp sections 18*a*, 18*b* out of engagement, although this may be advantageously done by hand.

Figure 10:
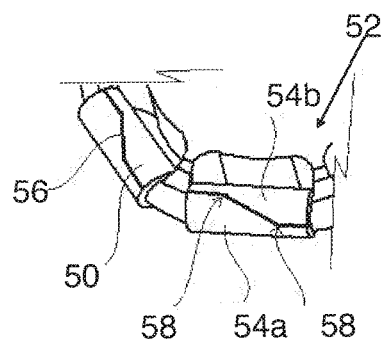
FIG. 10 is a perspective view of a part of a wheel frame on which are mounted axel bushes made according to a third embodiment comprising a smooth outer surface and a Z-shaped joining edge.
Figure 12:
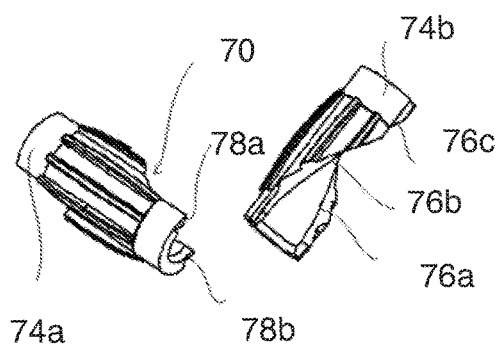
FIG. 12 is a perspective view of two component halves of an axel bush made according to a fifth embodiment comprising a bayonet catch, ten outer ribs and Z-shaped joining edges.

Referring to FIG. 10, there is shown a third embodiment of an axel bush 50 that comprises a substantially cylindrical structure 52 formed of identical component parts 54*a*, 54*b* in which the joining line 56 therebetween is formed from a continuous curved edge. The exterior surface of the component parts shows the appearance of the end flat sections that transition between an intermediate angular section with shallow angled corners 58.

It is noted that the third embodiment does not feature ribs longitudinally on the outer surface of the axel bush 50.

Figure 11A:
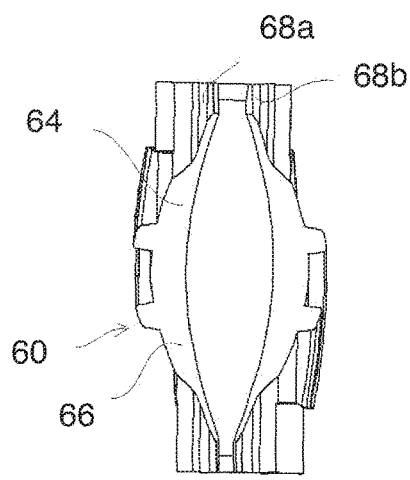
FIGS. 11a-11d are perspective views of a component part of an axel bush made according to a fourth embodiment comprising eight ribs and a helical joining edge.
Figure 11B:
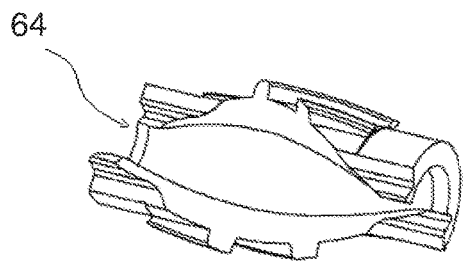
Figure 11C:
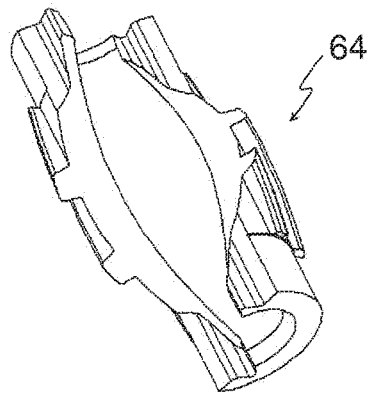
Figure 11D:
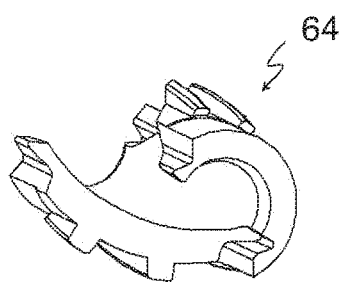
Figure 13:
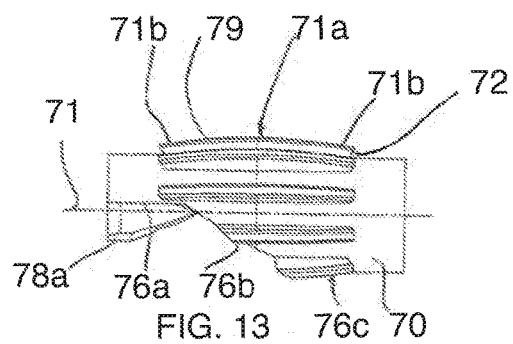
FIG. 13 is a side elevation of a component part of the axel bush shown in FIG. 12.
Figure 14A:
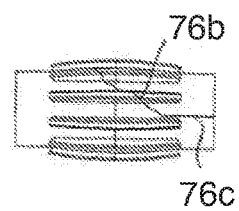
FIG. 14a is a side elevation of the component part of the axel bush shown in FIG. 13 mated to an identical part.
Figure 14B:
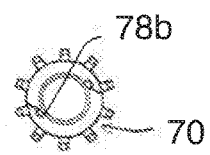

FIGS. 11*a* and 11*b* show a fourth embodiment in the form of component parts 64 of an axel bush 60. The component part 64 is adapted to engage with an identical component part 64 along curved side walls 66, which located together, join into abutting relationship by tongue and recess guides 68*a*, 68*b*.

In FIGS. 12-14*b*, there is shown a fifth embodiment in the form of an axel bush 70 comprising a pair of identical half component parts 74*a*, 74*b* that are adapted to mate together by engagement of bayonet engagement means or ramp sections 78*a*, 78*b*. The z-shaped outer side edges 76 comprise a middle inclined section 76*b* extending between outer straight edges 76*a*, 76*c* running substantially parallel to the longitudinal axis 71. However, preferably these straight edges obscure the curved joining edges or seats against which the component halves rest and abut when the bush is assembled.

The longitudinal ribs 79 feature a shallow arc shape in which the intermediate portion 71*a* shallowly rises relative to the respective end portion 71*b* and this follows the truncated fusiform shape of the rollers molded thereon. The respective rib ends 72 comprise an inwardly inclined wall to form small, sharp angled protrusions in order to better secure the roller molded thereon and thereabouts, so that some of the molded roller material extends radially inwardly relative to the outermost extent of the longitudinal rib 79.

Figure 15:
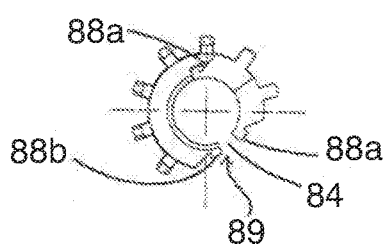
FIG. 15 is an end elevation of a component part of an axel bush according to a sixth embodiment comprising a bayonet catch, ten outer ribs and a helical joining edge.
Figure 16:
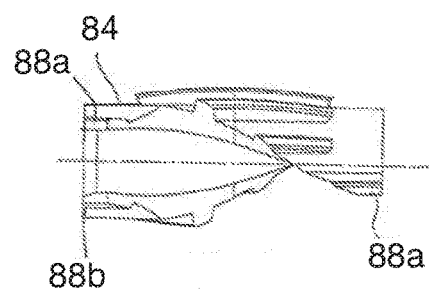
FIG. 16 is a side elevation of the component part shown in FIG. 15.
Figure 17:
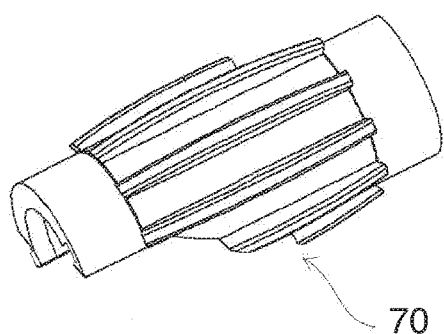
FIG. 17 is a perspective view of the component part shown in FIGS. 12 and 13.
Figure 18:
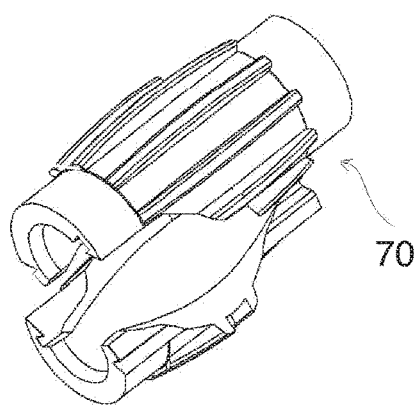
FIG. 18 is a second perspective view of the component parts of the unassembled axel bush shown in FIGS. 12 and 13.
Figure 19:
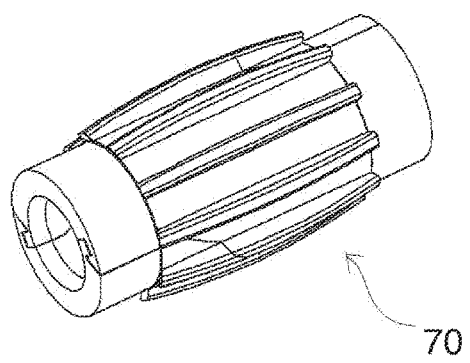
FIG. 19 is a perspective view of an assembled axel bush formed from the component parts shown in FIGS. 12 and 18.
Figure 20:
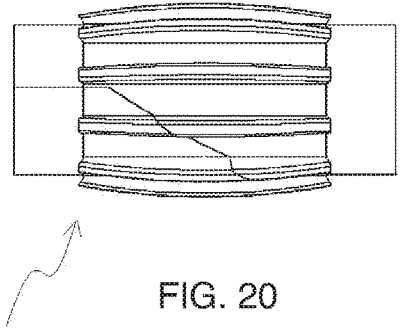
FIG. 20 is a side view of the completed axel bush shown in FIG. 19, an assembled axel bush according to an eighth embodiment similar to that shown in FIG. 19, but comprising ribs having flat ends.
Figure 21:
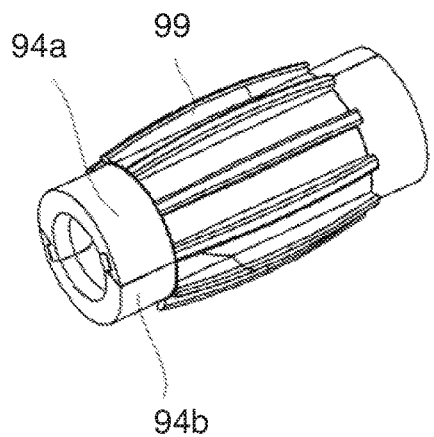
FIG. 21 is a perspective view of an assembled axel bush according to a seventh embodiment similar to that shown in FIG. 19, but having ridges terminating in straight rather than angular ends.
Figure 22:
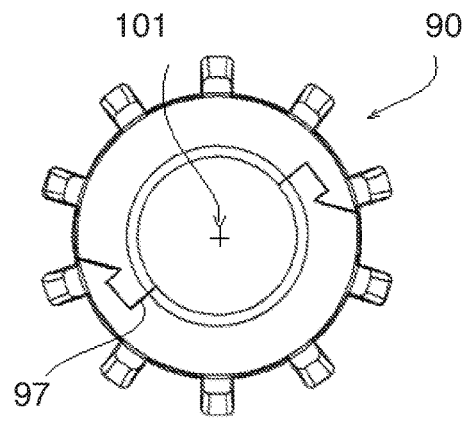
FIG. 22 is an end view of the completed axel bush shown in FIG. 21.
Figure 23:
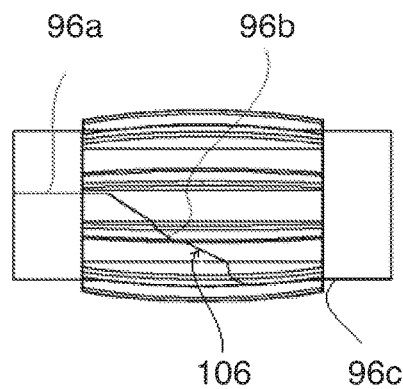
FIG. 23 is a side view of the completed axel bush shown in FIGS. 21 and 22.

Turning to FIGS. 15 and 16, there is shown a sixth embodiment in the form of an axel bush 80 in which only one component part 84 of a pair of component parts 84 is shown and demonstrates graphically the arrowhead or ramp engagement portion 88*a* and bulbous head portion 88*b*. In FIG. 15, the end elevation view illustrates that the opposed end portions 88*a*, 88*b* almost complete a full wrap-around the axel that has the same diameter as the internal diameter 81 (not shown) of the component part 84. A small opening 89 is provided that permits the single component part 84 to be mounted onto the axel. The component part 84 must be tilted at an angle offset to the axel axis to permit the component part 84 to be mounted onto the axel. Once mounted, the component part 84 hangs on to the axel in a loose resistance fit, but does require a small amount of force to be dislodged. However, if the component part 84 is made sufficiently rigid, it is not possible to remove the component part 84 from an axel without tilting the component part 84 relative to the axel axis.

Referring to FIGS. 21-23 and 26, there is shown an axel bush 90 comprising ten outer longitudinal ribs 99 and a pair of identical component parts 94*a*, 94*b* joined along a curved joining surface obscured by the shallow z-shaped line of the outer edges 96*a*-96*c*.

In FIGS. 24, 25, 27 and 28, there is shown an eighth embodiment in the form on an axel bush 100 comprising eight outer longitudinal ribs 109 and identical component parts showing a shallow z-shaped outer longitudinal edge 106 that obscures a spiral-shaped joining line or seat. It is considered that the straight end walls 97 that extend normally to the longitudinal axis 101 facilitate the molding process for the molding of a roller onto the axel bush 100 as all components, primarily the outer surface 107 of the cylindrical core 103 do not present any "cul-de-sacs" into which roller-molded material must be forced or allowed to move over time.

In relation to FIGS. 29-32, there is shown a ninth embodiment in the form of an axel bush 110 comprising eight large and radially tall longitudinal ribs 119, alternatingly interposed circumferentially around the axel bush cylindrical core body 112 with low-profile longitudinal ribs 129. The low-profile ribs 129 extend a greater length along the outer surface 115 of the core 112 but their shallow height permits the outer profile of the roller to be tapered toward each end of the roller. The radially taller and circumferentially wider ribs 119 provide substantial rigidity and strength for the central region 126 of the core 112. The ends 132 of the low-profile ribs 129 taper toward the outer surface 115, whereas the ends 134 of the tall ribs 119 end abruptly in an end wall 128 similar to the wall 108 of the eighth embodiment shown in FIG. 24. The inner surface 136 of the core 112 defines a cylindrical bore and snugly receives an axel while permitting rotation of the axel bush 110 relative to the axel 32 (see FIG. 5).

The bayonet, arrowhead or ramp section 118*a* extends radially at least two-thirds of the thickness of the core wall 112*a*. The core wall is preferably between 50% and 100%, preferably 60% and 80% of the radius of the bore 113. The neck 125 extending between the arrowhead or ramp section 118*a* and the core wall 112*a* is radially about 30% to 80%, preferably 40% to 60%, of the thickness of the core wall 112*a*, and the bulbous head 118*b* is correspondingly or complementarily so dimensioned so as to be snugly trapped in the recess 117 defined by the arrowhead or ramp section 118*a*, the neck 125 and the broad end wall 112*b* (not shown) of the core wall 112*a*. The bayonet or arrowhead or ramp section 118*a* includes a ramped surface that is inclined at an angle of about 30° to 70°, preferably 40° to 50° relative to a radial line extending from the axel bush 110 axis 111.

Each component part 114*a*, 114*b* includes a pair of the Z-shaped joining side edges 116 that extend longitudinally and parallel to the bush axis 111 from the bayonet head 118*a* apex or tip 138 along a straight edge wall 116*a* at the side of the core wall 112*a*. The straight edge extends to a first corner point 140 past one end 128 of the tall ribs 119. The first corner point 140 provides the transition from an axially parallel wall edge 116a to an inclined edge wall 116b extending through an intermediate region of the side wall 116. This structure permits minor relative movement along the adjoining surfaces 116 and alleviates the focusing or localization of such forces, which would otherwise form fatigued and weak structural points. Yet the bush 110 retains its integrity due to the strong engagement of structures 118a, 118b.

The inclined intermediate joining edge 116b transitions at a second corner point 142 at the other end of the component parts 114a, 114b into another axially straight edge 116c that is parallel to the first straight edge 116a.

Figure 33:
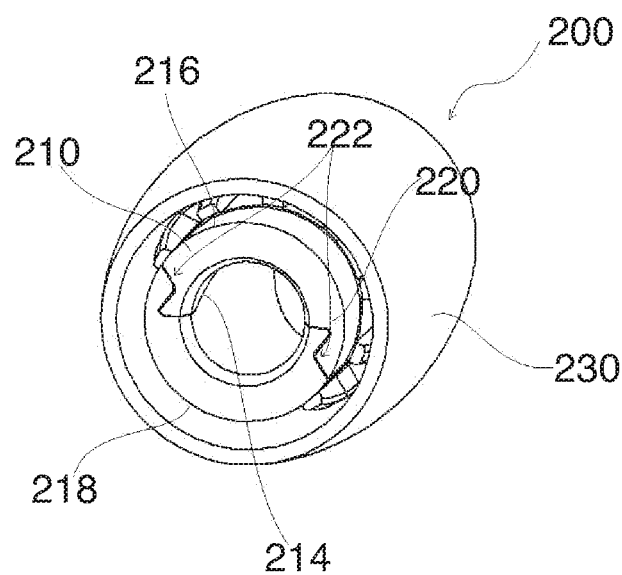
FIG. 33 is a perspective view of a bush according to a preferred embodiment.

Turning to FIG. 33, there is shown an assembled roller 200 comprising a cylindrical bush 210 having eight external rib surface features 212 and an over-molded roller 230. The joining edge 214 of the opposing component parts 216, 218 comprises, in axial end profile, a ramp section 220 comprising a ramp surface 222. The ramp surfaces lie in planes that are parallel or slightly offset by 1° to 20° to the direction or angle of approach of the respective opposed component part 216, 218 immediately prior to engagement, so that the ramp surfaces 222 are adapted to slidingly engage across ramp surfaces in a resistant, rather than snap, fit. This arrangement forms a catch that will hold the component part halves 216, 218 together during an over-molding process as long as the ends of the bush are retarded against axial displacement. This achieves a resistant catch that does not have a "hard" snap feature.

The ramp 220 configuration allows the joined halves 216, 218 to move when the bush 210 is under a load that causes distortion that would otherwise fail a "snap" design (one where mating parts must deflect or distort to permit engagement). The present embodiment eliminates the "clicking" sound that can be characteristic of bushings under load where the snap engagement continually fails and resets as the load shifts with transit.

Figure 34A:
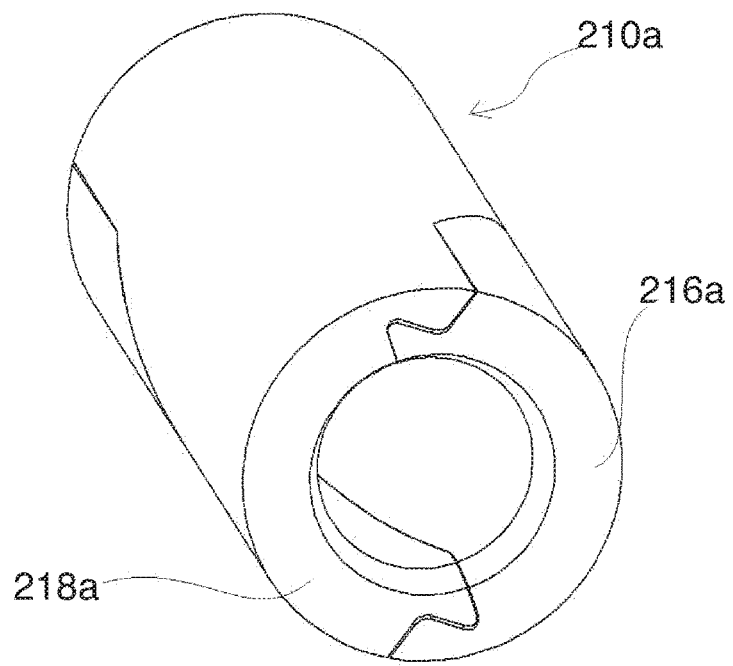
FIG. 34a is a perspective view of a cylindrical bush according to one embodiment.
Figure 34B:
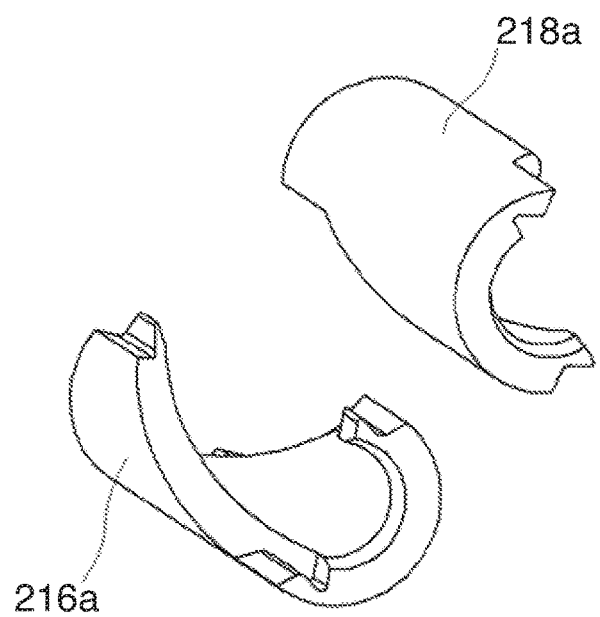

With reference to FIGS. 34a and 34b, there is shown a basic bush configuration 210a in which identical component halves 216a, 218a combine to form the bushing 210a. This is demonstrated by showing that component part 216a may be rotated to face "itself," thereby presenting opposing parts that may be combined to form the cylindrical bushing 216a. The bushing 210a may be over-molded with roller material to achieve a split bushing 210a that does not "coin purse" apart under pressure.

Figure 35A:
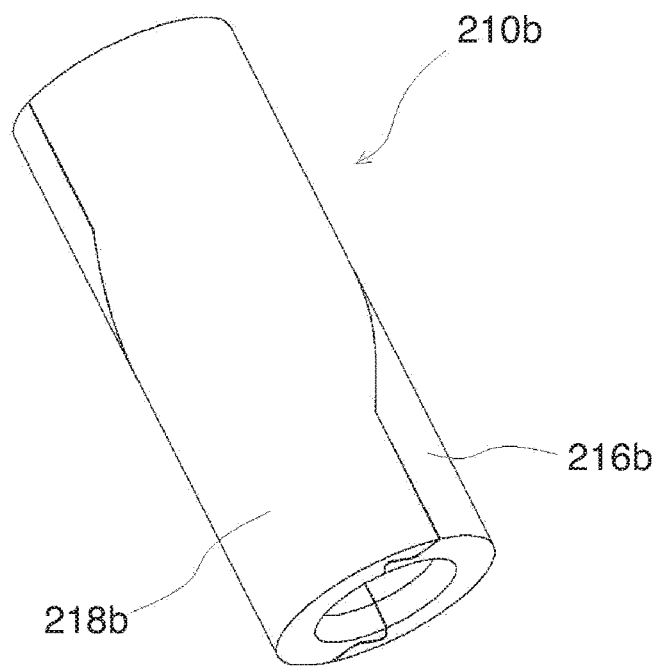
Figure 35B:
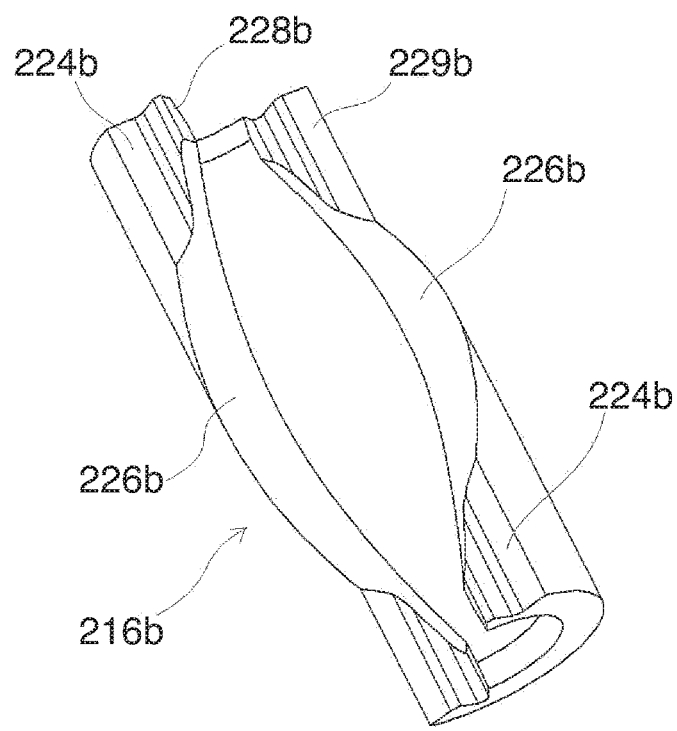

In FIGS. 35a and 35b, there is shown a more developed bushing 210b that is formed by the joining of two identical component halves 216b, 218b that include, at their respective end joining surfaces, flat segments 224b adjacent the end of each helical seat 226b. The flat segments 224b are effective to resist counter-rotation of the component parts 216b, 218b, which would otherwise allow the parts to move longitudinally on each other. The flat segment 224b also contains resistant-fit engagement features 228b, 229b that temporarily hold the component parts 216b, 218b together prior to over-molding of the bushing 210b with roller material.

Figure 36A:
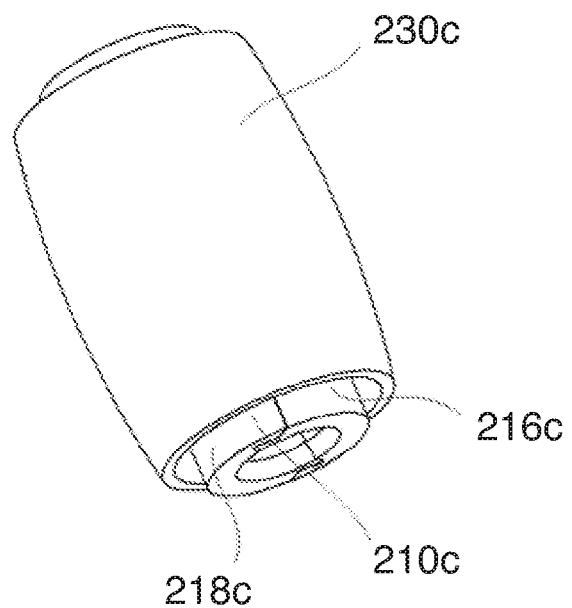
Figure 36B:
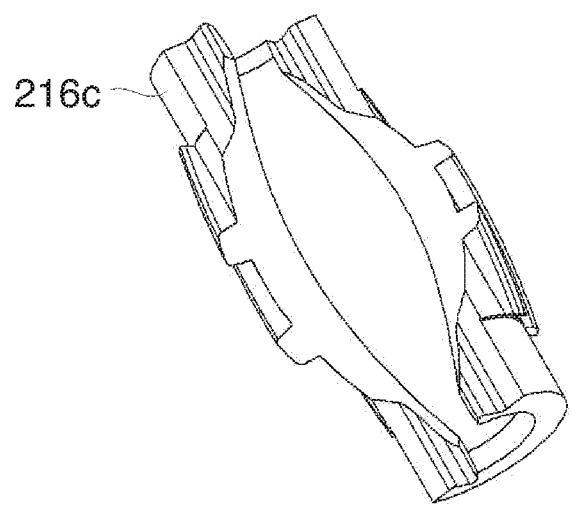

FIGS. 36a and 36b show more elaborate bushing 210c over-molded with a roller 230c. The bush 210c has a contoured body featuring longitudinal ribs 232c that provide both strength as well as systematic displacement of roller material and roll thickness control of roller 230c material that is molded over the combined identical bush halves 216c, 218c.

Figure 37A:
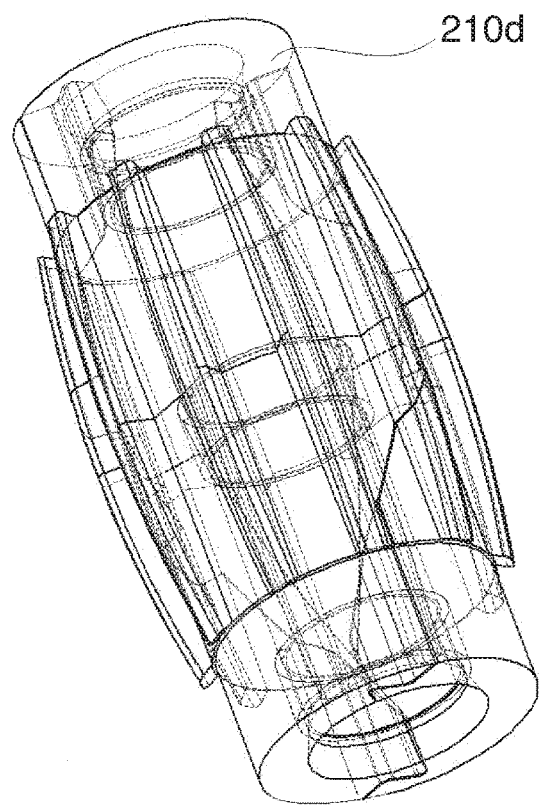
FIG. 37a is a perspective view of a cylindrical bush including axially spaced bearings according to another embodiment.
Figure 37B:
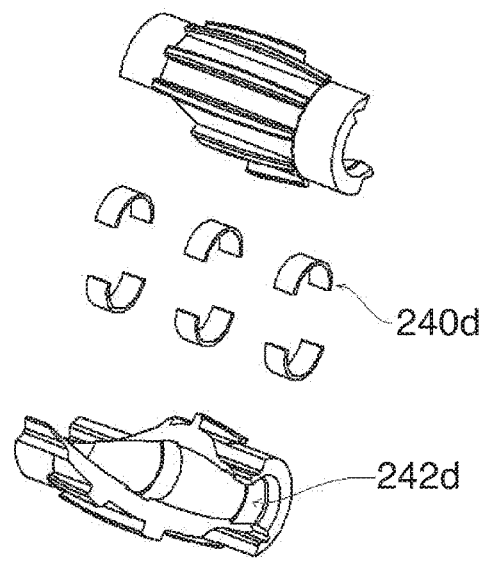
FIG. 37b is an exploded perspective view of the parts of the bush embodiment shown in FIG. 37a, noting that identical component halves form the bush of FIG. 37a and provide a housing for the axially spaced split bearings.

Referring now to FIGS. 37a, and 37b, there is shown a bushing 210d that is used to provide a housing 210d where a series of split bearings 240d is required. The combined bush 210d comprises internally annular seats for the assembled bearings 240d. Not only does the bush 210d provide a housing, but it also provides longitudinal strength, a means to keep the bearings 240d properly axially spaced and a means to provide over-molding of the roller material while keeping the split bearings 240d together.

Throughout the specification and claims, the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus," "means," "device" and "member" may refer to singular or plural items and are terms intended to refer to a set of properties, functions or characteristics performed by one or more items or components having one or more parts. It is envisaged that where an "apparatus," "means," "device" or "member" or similar term is described as being a unitary object, then a functionally equivalent object having multiple components is considered to fall within the scope of the term, and similarly, where an "apparatus," "assembly," "means," "device" or "member" is described as having multiple components, a functionally equivalent but unitary object is also considered to fall within the scope of the term, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation.

It will be appreciated by those skilled in the art that many modifications and variations may be made to the methods of the disclosure described herein without departing from the spirit and scope of the disclosure.

The disclosure can be described in terms of claims that can assist the skilled reader in understanding the various aspects and preferred embodiments of the disclosure. However, these claims are not to be construed as defining statements of the disclosure. It will be appreciated that other forms, aspects and preferred features of the disclosure and its embodiments described herein may ultimately be included in the claims defining the disclosure in the specifications of complete, international or national applications (or their subsequent corresponding patent grants) that may claim priority from the provisional application accompanying this specification. In this context, the following non-limiting claims assist to better describe the disclosure.

The invention claimed is:

1. A generally cylindrical axel bush for mounting on a mounting section of an axel where it is not possible to slide the axel bush onto the axel mounting section via either end of the axel, the axel bush formed by joining component parts together along joinable edges, the joinable edges each following a line that is at least partially non-parallel to the longitudinal axis of the generally cylindrical bush, wherein:

the component parts:
  each have two joinable edges and a first end wall and a second end wall; and
  fit together
at least one of the joinable edges:
  has a substantially helical-shape or spiral-shape through an intermediate region of the joinable edge so that the component part partially wraps around the axel having a longitudinal axis; and
  ends at a first end in a flat section,
the flat section is adapted to resist counter-rotation of one of the component parts relative to another of the component parts; and
the first end wall of one of the component parts is off-set about the longitudinal axis by 60-110 degrees compared to the second end wall of the same component part.

2. The axel bush according to claim 1, wherein said joinable edges axially trap the other of the component parts so that the component parts do not slide along the join line relative to each other.

3. The axel bush according to claim 1, wherein at least one of said joinable edges is helically shaped.

4. The axel bush according to claim 1, wherein said flat section connects through a transition to the intermediate section, the transition comprising an angled corner having an angle that is at least 90° to resist counter-rotation of the component parts relative to one another.

5. The axel bush according to claim 1, wherein each of the joinable edges includes the flat section that extends parallel to the longitudinal axis of the formed bush.

6. The axel bush according to claim 1, wherein the axel bush when unassembled consists of two of the component parts that are separate and mateable or joinable together to form the axel bush.

7. The axel bush according to claim 1, wherein said component parts are identical to each other and include mutually resistant-fit engageable parts.

8. The axel bush according to claim 7, wherein the flat section contains features of the mutually resistant-fit engageable parts that temporarily hold the component parts together prior to over-molding of the axel bush with roller material.

9. The axel bush according to claim 7, wherein the resistant-fit engageable parts include, in profile and extending longitudinally along the joinable edges, a bayonet-head, an arrow-head or a ramp-head-shaped male mating portion having a protruding edge that transitions into a ramp surface that is inclined at an angle to a radial line extending from the longitudinal axis of the generally cylindrical bush.

10. The axel bush according to claim 9, wherein each component part is in the form of a semi-cylindrical wall terminating at either end in the first and second walls and one of the resistant-fit engageable parts includes the ramp head-shaped male mating portion that terminates with a detent wall connected with the semi-cylindrical wall of the component parts by a neck, whereby the combination of:
  the detent wall,
  an internal surface facing toward a radial center of the semi-cylindrical wall and forming part of the neck, and
  a broad face of the end wall of the cylindrical wall,
  together define a recess for receiving the ramp head-shaped portion, the ramp head-shaped portion in profile being formed at a terminal surface of the joinable edges of the opposed component part.

11. The axel bush of claim 1, wherein the joinable edges include complementary ramp sections that have opposing and abutting surfaces that permit movement of the component parts of an assembled bush relative to each other under load, but trap the component parts in engagement by preventing the component parts from being pulled laterally or radially away from each other.

12. The axel bush of claim 1, wherein, when the axel bush is assembled on an axel, it is axially trapped by axel features that axially retard the component parts, each of the component parts does not slide along the join line or rotate about the longitudinal axis relative to the other of the component parts.

13. The axel bush of claim 1, wherein the first and second end walls are semicircular end walls.

* * * * *